(12) United States Patent
Rahm et al.

(10) Patent No.: US 11,754,005 B2
(45) Date of Patent: Sep. 12, 2023

(54) INTERNAL COMBUSTION ENGINE

(71) Applicant: VOLVO TRUCK CORPORATION, Gothenburg (SE)

(72) Inventors: Fredrik Rahm, Hörby (SE); Johan Carlén Andersson, Lund (SE); Ulf Aronsson, Lund (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/256,511

(22) PCT Filed: Jun. 28, 2019

(86) PCT No.: PCT/EP2019/067287
§ 371 (c)(1),
(2) Date: Dec. 28, 2020

(87) PCT Pub. No.: WO2020/002571
PCT Pub. Date: Jan. 2, 2020

(65) Prior Publication Data
US 2021/0277849 A1 Sep. 9, 2021

(30) Foreign Application Priority Data
Jun. 29, 2018 (WO) ............... PCT/EP2018/067546

(51) Int. Cl.
*F02D 41/00* (2006.01)
*F02D 13/02* (2006.01)
(Continued)

(52) U.S. Cl.
CPC .......... *F02D 41/0007* (2013.01); *F02B 37/20* (2013.01); *F02B 37/24* (2013.01);
(Continued)

(58) Field of Classification Search
CPC ........ F02M 26/05; F02M 26/07; F02M 26/08; F02M 26/10; F02M 26/16; F02M 26/23;
(Continued)

(56) References Cited

U.S. PATENT DOCUMENTS 2,041,445 A * 5/1936 Warren ................. F16D 41/088
192/48.6
4,231,225 A * 11/1980 Aya ........................... F01N 5/04
60/612
(Continued)

FOREIGN PATENT DOCUMENTS

CN 103375308 A 10/2013
CN 106150775 A 11/2016
(Continued)

OTHER PUBLICATIONS

International Search Report and Written Opinion dated Sep. 24, 2019 in corresponding International PCT Application No. PCT/EP2019/067287, 13 pages.
(Continued)

*Primary Examiner* — John M Zaleskas
(74) *Attorney, Agent, or Firm* — Venable LLP; Jeffri A. Kaminski

(57) ABSTRACT

The invention relates to an internal combustion engine comprising a crankshaft, one or more cylinders including a cylinder head, a piston, a combustion chamber, one or more intake valves, one or more exhaust valves, an intake system configured for feeding intake air to the engine, an exhaust system configured for conveying exhaust gas away from the engine, a pressure charging system connected to the intake system and an exhaust gas recirculation (EGR) system arranged to feed branched off exhaust gas from the exhaust system to the intake system via an EGR conduit wherein: * the internal combustion engine includes a valve actuation device configured to allow for late or early closing of the (Continued)

intake valves in accordance with late or early Miller-type valve timing, and wherein * the EGR system includes a gas feeding device configured to feed exhaust gas through the EGR conduit in modes of operation wherein the pressure in the intake system exceeds the pressure in the exhaust system, * wherein the gas feeding device is a displacement pump and wherein the gas feeding device is arranged so that exhaust gas recirculating in the EGR system during operation of the engine passes the gas feeding device before being mixed with intake air in the intake system. Additionally, a method of improving efficiency of an internal combustion engine is described.

27 Claims, 9 Drawing Sheets

(51) Int. Cl.
| | |
|---|---|
| F02M 26/05 | (2016.01) |
| F02M 26/16 | (2016.01) |
| F02M 26/34 | (2016.01) |
| F02D 41/14 | (2006.01) |
| F02M 26/22 | (2016.01) |
| F02B 37/20 | (2006.01) |
| F02B 37/24 | (2006.01) |
| F02B 39/04 | (2006.01) |
| F02B 39/10 | (2006.01) |
| F02B 67/06 | (2006.01) |
| F02D 41/26 | (2006.01) |
| F02M 35/10 | (2006.01) |

(52) U.S. Cl.
CPC ............. *F02B 39/04* (2013.01); *F02B 39/10* (2013.01); *F02B 67/06* (2013.01); *F02D 13/0234* (2013.01); *F02D 13/0269* (2013.01); *F02D 41/0047* (2013.01); *F02D 41/0077* (2013.01); *F02D 41/1448* (2013.01); *F02D 41/26* (2013.01); *F02M 26/05* (2016.02); *F02M 26/16* (2016.02); *F02M 26/22* (2016.02); *F02M 26/34* (2016.02); *F02M 35/10222* (2013.01); *F02B 2275/32* (2013.01); *F02D 2200/0406* (2013.01)

(58) Field of Classification Search
CPC . F02M 26/34; F02D 13/0269; F02D 41/0077; F02B 39/10
See application file for complete search history.

(56) References Cited

U.S. PATENT DOCUMENTS

| | | | | | |
|---|---|---|---|---|---|
| 4,373,498 | A | * | 2/1983 | Ushimura | ............ F02M 26/34 123/568.21 |
| 6,164,071 | A | * | 12/2000 | Shao | ............ F02M 26/40 60/605.2 |
| 6,216,458 | B1 | * | 4/2001 | Alger | ............ F02B 33/44 60/605.2 |
| 6,216,460 | B1 | * | 4/2001 | Shao | ............ F02M 26/05 60/605.2 |
| 6,216,461 | B1 | * | 4/2001 | Shao | ............ F02B 33/00 60/605.2 |
| 6,363,721 | B1 | * | 4/2002 | Prenninger | ............ F02B 33/44 60/611 |
| 6,435,166 | B1 | * | 8/2002 | Sato | ............ F02D 21/08 123/568.12 |
| 7,207,311 | B2 | * | 4/2007 | Chmela | ............ F02D 41/3035 123/305 |
| 7,281,527 | B1 | * | 10/2007 | Bryant | ............ F01L 1/26 123/564 |
| 2003/0154716 | A1 | | 8/2003 | Redon | |
| 2007/0023005 | A1 | * | 2/2007 | Chmela | ............ F02M 26/06 123/305 |
| 2007/0175215 | A1 | * | 8/2007 | Rowells | ............ F02B 37/24 60/605.2 |
| 2007/0220885 | A1 | * | 9/2007 | Turner | ............ F01N 5/04 60/605.2 |
| 2009/0235661 | A1 | * | 9/2009 | Janssen | ............ F02B 29/0418 60/599 |
| 2009/0249783 | A1 | * | 10/2009 | Gokhale | ............ F02D 41/005 60/602 |
| 2010/0122530 | A1 | * | 5/2010 | French | ............ F02B 37/007 60/602 |
| 2010/0146967 | A1 | * | 6/2010 | Simpson | ............ F02B 37/00 60/605.2 |
| 2010/0146968 | A1 | * | 6/2010 | Simpson | ............ F02B 37/001 60/605.2 |
| 2011/0094224 | A1 | * | 4/2011 | Sheidler | ............ F02B 37/004 60/605.2 |
| 2011/0094485 | A1 | * | 4/2011 | Vuk | ............ F02B 39/10 123/568.21 |
| 2011/0094486 | A1 | * | 4/2011 | Vuk | ............ F02B 37/004 123/568.21 |
| 2011/0302919 | A1 | * | 12/2011 | Schlemmer-Kelling | ............ F01N 5/04 60/605.2 |
| 2011/0314797 | A1 | | 12/2011 | Moravec et al. | |
| 2012/0137679 | A1 | * | 6/2012 | Rolando | ............ F04C 18/3564 60/605.2 |
| 2012/0198839 | A1 | * | 8/2012 | Nelson | ............ F02M 26/27 60/605.1 |
| 2013/0080034 | A1 | * | 3/2013 | Chi | ............ F02D 41/145 701/108 |
| 2013/0232972 | A1 | * | 9/2013 | Heiermann | ............ F02B 37/04 60/605.2 |
| 2013/0305709 | A1 | * | 11/2013 | Rollinger | ............ F02M 26/40 60/601 |
| 2013/0305715 | A1 | * | 11/2013 | Rollinger | ............ F02B 37/14 60/605.2 |
| 2015/0114366 | A1 | * | 4/2015 | Cantemir | ............ F02M 26/22 123/568.12 |
| 2015/0176536 | A1 | * | 6/2015 | Lutz | ............ F02D 21/08 123/568.21 |
| 2015/0226091 | A1 | * | 8/2015 | Nelson | ............ F02M 26/34 60/618 |
| 2016/0097332 | A1 | * | 4/2016 | Ulrey | ............ F02M 26/23 123/403 |
| 2016/0290210 | A1 | * | 10/2016 | Foege | ............ F02M 26/43 |
| 2016/0333827 | A1 | * | 11/2016 | Smiljanovski | ............ F02M 26/34 |
| 2017/0159619 | A1 | * | 6/2017 | Angelot | ............ F02B 37/10 |
| 2017/0260897 | A1 | * | 9/2017 | Ehrhard | ............ F02B 37/225 |
| 2018/0283297 | A1 | * | 10/2018 | Schnorpfeil | ............ F02M 26/05 |
| 2019/0128195 | A1 | * | 5/2019 | Lee | ............ F02B 29/0406 |
| 2020/0240371 | A1 | * | 7/2020 | Oh | ............ F02D 41/0007 |
| 2021/0131341 | A1 | * | 5/2021 | Bauer | ............ F02D 41/0007 |
| 2021/0180533 | A1 | * | 6/2021 | Rahm | ............ F02M 26/35 |
| 2021/0231065 | A1 | * | 7/2021 | Rahm | ............ F02D 41/0047 |

FOREIGN PATENT DOCUMENTS

| | | | | |
|---|---|---|---|---|
| CN | 107810315 | A | | 3/2018 |
| DE | 102017102346 | A1 | * | 8/2017 ............ F02M 26/34 |
| DE | 102017102346 | A1 | | 8/2017 |
| EP | 2196659 | A1 | * | 6/2010 ......... F02B 29/0412 |
| EP | 2196659 | A1 | | 6/2010 |
| JP | 11062715 | A | * | 3/1999 ............ F02M 26/07 |
| JP | 2008075549 | A | | 4/2008 |
| JP | 2012251509 | A | | 12/2012 |
| JP | 2014122575 | A | * | 7/2014 |
| JP | 2014122575 | A | | 7/2014 |

(56) References Cited

FOREIGN PATENT DOCUMENTS

JP  2016003585 A  1/2016
WO  2013151760 A1  10/2013

OTHER PUBLICATIONS

S.P. Edwards et al; The Potential of Combined Miller Cycle and Internal EGR Engine for Future Heavy Duty Truck Applications dated Feb. 23-26, 1998, 21 pages.
China Office Action dated Nov. 24, 2021 in corresponding China Patent Application No. 201880095166.2, 11 pages.
China Office Action dated Dec. 22, 2021 in corresponding China Patent Application No. 201980043739.1, 11 pages.

* cited by examiner

INTERNAL COMBUSTION ENGINE

CROSS-REFERENCE TO RELATED APPLICATIONS

This application is a U.S. National Stage application of PCT/EP2019/067287, filed Jun. 28, 2019, and published on Jan. 2, 2020, as WO 2020/002571 A1, which claims priority of International Application No. PCT/EP2018/067546, filed Jun. 29, 2018, all of which is hereby incorporated by reference in its entirety.

TECHNICAL FIELD

The present invention relates to an internal combustion engine and a method of improving efficiency of an internal combustion engine.

The invention may be applied in a variety of combustion engines. The invention is, however, particular advantageous when applied for engines configured for heavy-duty application such as in trucks, busses, construction equipment, marine applications and stationary applications etc.

Although the invention will, in the below, be described with respect to application in a truck, the invention is not in any way limited to this particular application.

BACKGROUND

Heavy duty internal combustion engines are well known in the art.

In order to minimize fuel consumption, recent internal combustion engines may be provided with advanced turbine systems configured for recovering energy in the exhaust gas flow. The advanced turbine systems may, in a first section, include a turbocharger arranged in the exhaust gas flow downstream the engine. The turbocharger is configured to convert energy from the exhaust gas into pressure increase of the intake air. In a second section, the advanced turbine system may, downstream the turbocharger, include a turbocompound unit configured to convert at least a part of the remaining energy in the exhaust gas into rotational movement of a shaft. The rotational movement of the shaft is transferred as a torque contribution to the crankshaft of the engine.

Other known turbine systems include, as an example, two turbochargers arranged in series such that the intake air is compressed in two stages comprising an initial compression by means of one of the turbochargers, and a final compression by means of the second turbocharger.

The use of advanced turbine systems has proven to provide significant advantages; especially with respect to fuel efficiency.

In order to reduce in particular nitrogen oxide (NOx) emissions, the formation of which is highly dependent on the temperature in the combustion chamber, exhaust gas recirculation systems (EGR) have been used widely for many years. NOx is produced in a relatively narrow band of high cylinder temperatures and pressures. The recirculation of exhaust gas in effect dilutes oxygen level in the intake air by supplying gases inert to combustion; thereby acting as absorbents of combustion heat to reduce cylinder temperatures.

In a high pressure external EGR system (sometimes referred to as short route EGR system), exhaust gas is branched off from the flow of exhaust gas upstream any turbine provided in the exhaust system whereas, in a low pressure external EGR system (sometimes referred to as long route EGR system), the exhaust gas is branched off from the flow of exhaust gas downstream any turbine provided in the exhaust system; sometimes also downstream any catalytic converter and/or any exhaust gas particulate filter. Internal EGR systems where parts of the exhaust gas is left in the cylinder have also been proposed.

Especially, but not exclusively, in transient parts of engine operation cycles, the flow of exhaust gas recirculation may not be sufficient to provide the effects mentioned above as, on engines provided with advanced turbine system in combination with EGR systems, the differential pressure between the exhaust gas system and the pressurised intake system may not be sufficient to facilitate the EGR flow required to control engine emissions (NOx).

One way of handling EGR for engines with higher pressure on intake side than on exhaust side is to make use of a technique known as VGT (Variable Geometry Turbine) where the turbine flow area is reduced until the backpressure in the exhaust manifold is sufficient to establish an EGR drive. This reduces the turbo efficiency but the technique is functional since it can be adjusted to different engine operating modes. Another way is to add back pressure by arranging a further exhaust turbine downstream the turbo turbine allowing recovering of some of the energy via the further turbine. This is often referred to as turbocompound. It has further been proposed to arrange a pump/compressor in the EGR system for feeding gas from the exhaust side to the intake side. Such a design is, however, rare on commercial engines, possibly due to durability problems. Also low pressure EGR systems has been proposed for engines having higher pressure on intake side than on exhaust side. A general drawback of low pressure EGR is that it adds more weight and cost and requires more space than high pressure EGR. Generally, the main focus for engines of this type is set on improving various VGT and turbocompound designs.

Another approach for increasing engine efficiency is the use of early or late closing of intake valves so that the intake valve either closes some instances before the piston reaches its bottom dead center (BDC) during the intake stroke, to allow a smaller amount of air to enter the cylinder than with normal closing at BDC, or so that the intake valve closes some instances after the piston has left the BDC at the beginning of the compression stroke, so that some air is expelled back to the intake system at the beginning of the compression stroke. This is often referred to as (early and late) Miller-type timing for the intake valves. The advantage of an engine operating according to the Miller-type intake valve timing is that the engine's expansion ratio in effect is greater than the compression ratio. Engines operating according to this principle are often referred to as "over expanded engines". Miller engines provided with high efficiency pressure charging systems suffer, however, from offering no or very limited EGR flow. An effect of this is that two lines in engine development can be discerned: one line where the engines are based on Miller-type valve timing but where alternatives to EGR are used for reducing NOx; and another line where the engines are based on regular valve timing and the use of EGR.

As exemplified above there are many ways of increasing the efficiency of internal combustion engine systems and there is a general desire to improve the internal combustion engine technology even further to reduce fuel consumption as well as to reduce emissions; in particular the NOx emissions—while, at the same time, maintaining satisfactory power level and service life of the internal combustion engines.

SUMMARY

An object of the present invention is to provide a high efficiency internal combustion engine configured for offering lower fuel consumption and/or lower emissions; in particular lower NOx emissions.

The present invention enables EGR flow during all operation cycles in internal combustion engines not being able to establish sufficient differential pressure between the exhaust system and the pressurised intake system, even when the engine is operated according to the Miller-type valve timing principles. By this, an internal combustion engine offering reduced fuel consumption, lower emissions and more flexible engine operating cycles in terms of emissions versus speed and load is provided while maintaining, or even increasing, service life.

According to a first aspect of the invention, the object is achieved by an internal combustion engine according to the appended claims.

The object is achieved by an internal combustion engine comprising a crankshaft, one or more cylinders including a cylinder head, a piston, a combustion chamber, one or more intake valves, one or more exhaust valves, an intake system configured for feeding intake air to the engine, an exhaust system configured for conveying exhaust gas away from the engine, a pressure charging system connected to the intake system and an exhaust gas recirculation (EGR) system arranged to feed branched off exhaust gas from the exhaust system to the intake system via an EGR conduit wherein:
- the internal combustion engine includes a valve actuation device configured to allow for late or early closing of the intake valves in accordance with late or early Miller-type valve timing, and wherein
- the EGR system includes a gas feeding device configured to feed exhaust gas through the EGR conduit in modes of operation wherein the pressure in the intake system exceeds the pressure in the exhaust system,
- wherein the gas feeding device is a displacement pump and wherein the gas feeding device is arranged so that exhaust gas recirculating in the EGR system during operation of the engine passes the gas feeding device before being mixed with intake air in the intake system.

The joint combination of i) a gas feeding device in the form of a displacement pump arranged to feed pressurised exhaust gas through an EGR conduit and, downstream the displacement pump, into the intake system (that has a higher pressure than the exhaust system), and ii) late or early closing of the intake valves according to the principles for Miller-type valve timing in a pressure charged engine, together allows for optimization of the engine in all modes of operation, transient as well as designed, and has the advantage of maintaining a low NOx emission while at the same time lowering the fuel consumption. A particular advantage is that it allows for a sufficient flow of EGR in a high pressure EGR system even when using a high efficiency pressure charging system (including e.g. a turbocharger with an efficiency >60%), which enhances the effects of the Miller-type valve timing. In addition, the gas feeding device can both increase the pressure on the engine intake side and reduce the pressure on the engine exhaust side, which also enhances the effects of the Miller-type valve timing.

An advantage of using a displacement pump compared to e.g. a radial compressor is that the displacement pump is not only capable of handling pressure pulses without losing efficiency or causing flow instabilities (pulsating flows are difficult to handle in a radial compressor) but also capable of utilizing pressure pulses in the exhaust system for at least partly driving the pump as the pulses passes the pump. This and other advantages of using a displacement pump are further explained below.

It may be noted that what is mentioned above about operation modes where the pressure is higher in the intake system than in the exhaust system refers to general values over some reasonably long time period. Occasionally, and typically when the exhaust valves open and exhaust pulses are produced, the pressure can be higher on the exhaust side than on the intake side even if the pressure generally is higher in the intake system than in the exhaust system.

As specified above, the gas feeding device/displacement pump is arranged so that exhaust gas recirculating in the EGR system during operation of the engine passes the gas feeding device before being mixed with intake air in the intake system. This means, for instance, that the EGR conduit does not connect to the intake system for mixing of EGR and intake air upstream of the gas feeding device (where "upstream of" refers to the flow of intake air in the intake system), which would make it possible for highly pressurized intake air to flow through the EGR conduit instead of through the gas feeding device and further towards the cylinders. Thus, the gas feeding device is arranged so that only exhaust gas, and no fresh intake air, reaches an inlet of the gas feeding device during exhaust gas recirculation.

In an embodiment the EGR conduit is arranged to connect to the exhaust system at a first connection point and arranged to connect to the intake system at a second connection point, wherein the gas feeding device is arranged in the EGR conduit between said first and second connection points. Thus, the gas feeding device/displacement pump is arranged in the EGR conduit in a position upstream of (with reference to the EGR flow) the second connection point where the EGR flow mixes with the intake air during operation of the engine.

In an embodiment the pressure charging system comprises a compressor arranged in the intake system and a turbine arranged in the exhaust system and wherein the EGR conduit is arranged to connect to the intake system downstream the compressor and to connect to the exhaust system upstream the turbine so as to form a high pressure EGR system. A high pressure EGR system is conventionally considered unsuitable for an engine with Miller-type valve timing but the use of the gas feeding device/displacement pump according to above makes the high pressure EGR system suitable in this case. Compared to a low pressure EGR system the high pressure EGR system provides for a higher total efficiency since the steps of expanding and then compressing the exhaust gas in a low pressure EGR system lead to a loss in total efficiency.

The gas feeding device in the EGR system may be driven in various modes which has, as one example, the advantage that the EGR system can be driven independently from, or in response to, the available differential pressure between the exhaust system and the intake system while also allowing for operation in dependence of different operating conditions—which will be explained in greater detail below.

Late or early closing of the intake valves, compared to closing of intake valves in conventional four stroke engine cycles such as Otto-engines, increases, as explained above, the effective expansion ratio of the engine. This in turn results in increased engine efficiency as the early or late closing of the intake valves results in, that the effective swept volume during inlet (early Miller-type valve timing) or during compression (late Miller-type valve timing) is reduced. The reduced swept volume may be compensated for by increasing the pressure in the intake system, e.g. by means of a pressure charging system.

In order to allow for exhaust gas from the EGR system to enter the intake system, the pressure in the EGR system must be matched, or pressurised, to exceed the pressure in the intake system to ascertain that a sufficient volume of exhaust gas enters the intake system. The gas feeding device will provide for such a pressure increase of the exhaust gas; thereby offering the abovementioned advantages in accordance with an aspect of the present invention.

Miller-type valve timing may be provided, for example, by a fixed valve actuation system such as a fixed or rotationally displaceable camshaft. Another example is variable valve actuation systems configured to vary cam profile and timing. Yet another type of variable valve actuation system is a fully variable valve actuation system, that may operate the individual valves separately via a control system. A fully variable valve actuation system may, as examples, be operated by electro-magnetic or electro-hydraulic, electro-hydraulic-pneumatic, electro-hydraulic-pneumatic, electro-pneumatic, pneumatic or hydraulic actuators.

According to one embodiment, the engine may further include an EGR bypass conduit arranged to bypass the gas feeding device. By this, EGR flow may be provided via natural or unassisted flow. It may be desirable to bypass the gas feeding device under circumstances, where the pressure in the exhaust system is sufficient for the EGR system to deliver a sufficient flow rate of exhaust gas to the intake system, as the energy efficiency of the engine is further improved when no pump work is applied to the EGR stream. One or more bypass valves may optionally be provided in the bypass conduit or elsewhere in the EGR system for controlling the bypass flow.

According to a further embodiment, the EGR system may include an EGR valve configured for controlling flow of gas in the EGR system. The gas feeding device may, in some embodiments, be used as EGR valve so a separate EGR valve may not be required. Moreover, the gas feeding device may be used for measuring and/or validating the EGR flow. Hereby the exact amount of exhaust gas can be controlled according to the requirements.

According to a further embodiment, the EGR system may include an exhaust gas cooler, or EGR cooler, arranged in the EGR conduit upstream and/or downstream the gas feeding device. By this, colder, and thereby more dense, exhaust gas may be provided to the intake system while lowering the combustion temperature.

According to a further embodiment, the gas feeding device may be configured for pressurising the EGR system as follows:

$$\Delta P \text{ gas feeding device} = (P \text{ Intake System} - P \text{ Exhaust System}) + \Delta P \text{ EGR system}$$

By this, an EGR system configured facilitating EGR in all modes of operation is provided. Moreover, it is ensured that the necessary amount of exhaust gas may be returned to the intake system. The overall pressure difference between the intake system, P Intake System, and the exhaust system, P Exhaust System, as well as possible pressure losses, $\Delta P$ EGR system, in the EGR system may be overcome to provide the intended effect.

Advantageously the gas feeding device may be adapted to produce a pressure at least corresponding to the pressure in the intake system, which will correspond to the pressure delivered by the pressure charging system.

In various embodiments, the EGR system may constitute a high or low pressure external EGR system c.f. the introductory part of this specification. A high pressure EGR system will typically be the preferred solution due to its efficiency and simplicity.

According to a further embodiment, the gas feeding device/displacement pump is of a Roots blower type having a pair of rotary members provided with meshing lobes. By this, an effective and flow controlling pump allowing also for inverted pump operation is provided. In alternative embodiments, the gas feeding device may constitute another type of positive displacement pump.

A gas feeding device of the displacement type does not have internal compression; such a gas feeding device will thus only create compression work when the outlet pressure is higher than the inlet pressure of the gas feeding device. Since the exhaust gas pressure is pulsating, the work required by the gas feeding device is minimized. Each time an exhaust pulse reaches and passes the displacement pump the power required to drive the pump is reduced. For a pump with internal compression (screw, centrifugal, piston, radial compressors, etc.) there is a discharge loss every time there is a lower pressure compared to the pressure built up in the pump. Therefore, the characteristics of a displacement pump are more suitable for feeding, or pumping, exhaust gas.

A particularly suitable pump is a so-called Roots blower which is a positive displacement pump operative to pump a fluid by means of rotation of a pair of meshing lobes; not unlike a set of stretched gears. Fluid is trapped in pockets surrounding the lobes and carried from the inlet side of the pump (i.e. the exhaust system in the application according to the present invention) to the outlet side of the pump (i.e. the intake system in the application according to the present invention).

Additionally, a displacement pump is not as sensitive to changes in intake or outlet conditions as, for example, a centrifugal compressor is. The operation of a centrifugal compressor moreover suffers severely from fluctuating intake pressure.

Drawbacks of arranging a radial compressor (with internal compression) for feeding exhaust gas in the EGR system can be summarized as follows: i) energy is wasted when compression occurs as compressed gas is dumped at each pressure variation; ii) condensed water in the EGR is likely to damage the impeller of the radial wheel; iii) a radial compressor simply does not function together with pulsating exhaust flow (It would have to be dampened prior to entering the compressor/pump with large energy losses as a result. Both surge (the flow stalls) and choke will occur. Surge means instability in the flow and that the compressor in principle does not function at all. Choke means very low efficiency and risk for oil leakage from the bearing system etc.); and iv) a radial compressor would introduce a high risk for surge in the turbo compressor since it has a strong relation between pressure ratio and flow (a high EGR flow requires a high pressure ratio which is likely to lead to surge in the turbo compressor). Such drawbacks are avoided with a displacement pump.

The displacement type gas feeding device characteristics may allow for omission of EGR flow measurement and control devices such as valves etc. as pump speed data in correlation with pump characteristics as well as temperature of the pumped medium is indicative of the flow through the EGR system. If a pump speed of the displacement pump is zero, no exhaust gas will flow through the gas feeding device (except for some minor leakage).

According to a further embodiment, the gas feeding device may be connected to, and driven by, an EGR drive unit.

According to a further embodiment, the EGR drive unit may be configured to be driven by the gas feeding device to generate a power output. By this, power take off in a compound mode is made possible. In compound mode, it is thus possible to recover energy from the gas feeding device when driving the gas feeding device by means of the flow of exhaust gas; such as in conditions when there is a higher pressure in the exhaust system than in the intake system.

According to a further exemplary embodiment, the engine may include an EGR drive unit configured for driving the gas feeding device as well as an energy receiving unit configured to be driven by the gas feeding device. The energy receiving unit may be configured for converting energy from the gas feeding device into electrical power, mechanical power including hydraulic and/or pneumatic power etc. This embodiment may moreover include gear or coupling means configured to facilitate switching between the operational modes.

According to a further embodiment, the EGR drive unit may constitute an electrical motor or a mechanical drive, such as a belt drive or a chain drive or a gear drive or a hydraulic drive or a pneumatic drive, configured for transferring energy to the engine or to an energy reservoir such as a battery or a capacitor.

According to a further embodiment the EGR drive unit constitutes an electrical motor or a mechanical drive connected to the crankshaft.

According to a further embodiment the EGR drive unit is configured for transferring energy to the engine or to an energy reservoir such as a battery or a capacitor.

According to a further embodiment, the power output from the EGR drive unit may be used for operating the engine in compound mode.

According to a further embodiment, the gas feeding device is connected to the EGR drive unit via a rotatable drive connection. The rotatable drive connection may form a connection between a rotary part of the displacement pump, such as the rotary members provided with meshing lobes of a roots blower, and a rotary part of the EGR drive unit, such as the driving/driven shaft of an electric motor/generator.

According to a further embodiment, the rotatable drive connection comprises a first shaft member connected to the EGR drive unit and a second shaft member connected to the gas feeding device, wherein the first and second shaft members are connected via a freewheel mechanism configured to allow the second shaft member to rotate at a higher speed than the first shaft member in an operation mode where the first shaft member forms a driving shaft and the second shaft member forms a driven shaft and exhaust gas is fed through the EGR conduit. Accordingly, the freewheel mechanism provides at least for the possibility of letting a rotary part of the gas feeding device/displacement pump to rotate at a higher rotation speed than the driving rotation speed of the EGR drive unit. This is of particular interest for allowing the rotation speed of the displacement pump to increase when an exhaust gas pressure pulse reaches the pump so as to further utilize the energy provided in the exhaust pulse.

That the second shaft member is allowed to rotate at a higher speed than the first shaft member in an operation mode where the first shaft member forms a driving shaft and the second shaft member forms a driven shaft and exhaust gas is fed through the EGR conduit is intended to only relate to the rotational direction of the freewheel function; it should not be interpreted as limiting the operation mode. In other words, the second shaft can rotate freely in the same direction as it rotates when the displacement device is driven by the EGR drive unit and feeds exhaust gas towards the intake system. This means that the second shaft can rotate freely in the same direction also when the EGR drive unit is stationary.

A freewheel mechanism is a device for connecting two rotatable shafts where the shafts are coupled in one rotational direction and uncoupled in the other direction. In a transmission, such as the rotatable drive connection between the gas feeding device and the EGR drive unit, the freewheel mechanism disengages the driveshaft from the driven shaft when the driven shaft rotates faster than the driveshaft. Freewheel mechanisms are well known as such. A freewheel mechanism may be equipped with a locking arrangement which locks the shafts together independently of rotational speed or rotational direction. An example of a lockable freewheel mechanism is disclosed in U.S. Pat. No. 2,041,445.

Providing the rotatable drive connection between the gas feeding device and the EGR drive unit with a freewheel mechanism according to above has several advantages:

1. It effectively transforms the displacement pump into a check valve with low flow resistance. A pulse coming from the exhaust manifold is allowed to pass the pump and if the pulse is large enough the speed of the pump will even increase. On the other hand, a pulse moving in the opposite direction will stop at the pump.

2. It increases the operating range over which the pump does not require driving power from the EGR drive unit while still provides enough EGR flow to the engine intake system.

3. It makes the engine system as a whole more robust with less impeded drivability in case of failure of the EGR drive unit since enough EGR can still be provided in parts of the engine operating range and some EGR can still be provided a large part of the engine operating range.

4. It puts less stress on the pump in case the drive unit for some reason shuts down rapidly since the pump is still allowed to rotate freely 5. It puts less stress on the EGR drive unit since the EGR drive unit can be shut down (in a controlled manner) in parts of the engine operating range.

According to a further embodiment, the freewheel mechanism is provided with a locking function configured to rotationally lock the first and second shaft members to each other. This may be advantageous in situations when the gas feeding device/displacement pump is driven by the EGR drive unit but in particular this is of interest when operating the engine and the gas feeding device/displacement pump in energy recovery mode (compound mode) where the displacement pump drives the EGR drive unit and the EGR drive unit generates a power output. The locking function is also of interest for driving the gas feeding device/displacement device in a reversed mode (backwards).

According to a further embodiment, the engine, the gas feeding device and the EGR drive unit are configured for operation in a first mode and in a second mode wherein, in first mode, the gas feeding device and the EGR drive unit are configured for feeding exhaust gas into the intake system by pressurising the exhaust gas, and, in second mode, supplying pressure to the pressure charging system. By this, the pressure charging system may be pressurised by means of the EGR system. This is beneficial e.g. in operating conditions wherein the turbine in the pressure charging system is operating below desired speed, i.e. to assist turbocharger spin up and thereby reducing turbo lag.

According to a further embodiment, the gas feeding unit and the EGR drive unit may be configured for supplying pressure to the pressure charging system by operating in an least partially reversed mode of operation. By this, the gas feeding unit feeds the exhaust gas to the pressure charging system instead of into the intake system.

According to a further embodiment, the engine may further include a gas re-directing system configured for conveying gas pressurised by the gas feeding device to the pressure charging system.

According to a further embodiment, the engine may include one or more flow control valves operative to control the flow of gas in the gas re-directing system.

According to a further embodiment, the valve actuation device configured for operating the intake valves may be a variable valve actuation device such as a variable camshaft or an electronically controlled system configured for individual valve actuation. By this, Miller-type valve timing of the intake valves are provided; possibly in a dynamic manner.

According to a further embodiment, the valve actuation device may be configured or controlled to keep the intake valves open until the crankshaft reaches the range of 580 CAD to 680 CAD, preferably the range of 600 CAD to 650 CAD. These are typical values for late Miller-type valve timing. However, the exact value to be used depends on the particular engine, valves, valve seats, etc.

According to a further embodiment, the valve actuation device may be configured or controlled to keep the intake valves open until the crankshaft reaches the range of 500 CAD to 560 CAD, preferably the range of 520 CAD to 550 CAD. These are typical values for early Miller-type valve timing. However, the exact value to be used depends on the particular engine, valves, valve seats, etc.

The selection of the desired timing, in late as well as in early Miller-type valve timing engines, may, in some embodiments, take place dynamically and in accordance the operating conditions—where the abovementioned ranges have shown desirable results.

In some embodiments, the valve actuation device may be configured to, or operated to, control the intake valves dynamically across the ranges listed under late Miller-type valve timing and early Miller-type valve timing.

According to one example embodiment, the valve actuation device may be a camshaft such as a camshaft for the intake valves in a DOHC engine. The intake valves are in such embodiment arranged to be operated, of lifted, by the camshaft; possibly via intermediate mechanisms. Early Miller-type valve timing as well as late Miller-type valve timing can be achieved with a fixed camshaft as the timing of the intake valve opening may be controlled by controlling the timing of the camshaft with respect to the crankshaft.

The Variable Valve Actuation (VVA) device may constitute a variable camshaft or a VVA system with individual valve actuation. A VVA system is preferred due to its versatility for different operating parameters. A fully variable VVA system, where the valve timing, i.e. opening and closure of the intake valves, may be controlled individually for each valve and hence each cylinder is considered preferable. A VVA system may, as examples, be operated by electro-magnetic or electro-hydraulic forces to open the valves. In further examples, electro-hydraulic-pneumatic, electro-hydraulic-pneumatic, electro-pneumatic, pneumatic or hydraulic actuators.

The VVA device will provide for increased flexibility in the system and, by incorporating a full VVA system, both early and late Miller-type valve timing may be achieved by the same system.

Variable opening and closing of the intake valves have the advantage of allowing for late and/or early Miller-type valve timing dependent on specific operating parameters, for example controlling the engine to operate in different theoretic stroke volumes for different operating cycles.

According to a further embodiment the pressure charging system may be configured for establishing an intake pressure in the intake system which is higher than a pressure in the exhaust system. By this, increased engine efficiency is provided.

According to a further embodiment, the pressure charging system may include a turbocharger in the form of a single turbocharger, a twin turbocharger system, a variable geometry turbine or a turbo-compound as well as, as an example, a turbocharger and a turbo compound unit arranged downstream the turbocharger. According to another example embodiment, the pressure charging system may include one or more electrically or mechanically driven blowers or compressors. The mentioned pressure charging systems may all provide for a positive pressure difference over the engine, i.e. a state of operation where the pressure in the intake system is higher than in the exhaust system. However, a single turbocharger, a twin turbocharger, a variable geometry turbo or a turbo-compound will most often be the preferred solutions, as these will contribute to the overall fuel economy at least through their utilization of the exhaust gas energy for driving the intake side pressure creation. In case of using a pressure charging system involving an exhaust side turbine, the pressure in the intake system is preferably higher than the pre-turbine pressure, i.e. the pressure before the turbine.

Commonly used turbochargers have an efficiency of about 50-55%. Turbochargers having efficiencies above 55% are considered efficient turbocharges and turbocharges having efficiencies above 60% are considered high efficiency turbochargers.

Efficiency of a turbocharger is related to the ratio of the air pressure after the compressor compared to the air pressure before the compressor but involves also other parameters, such as change of temperature for a given change of pressure.

The engine described here may be operated with a common turbocharger however it should be noted that higher turbo efficiency results in higher efficiency of the engine.

According to a preferred example embodiment, the pressure charging system may include a high efficiency turbocharger with a compressor and an exhaust side turbine configured to boost a higher pressure than the pre-turbine pressure in the exhaust system. The high efficiency turbocharger releases the full potential of the concept. It can be a high efficiency single stage turbo, dual stage turbo (DST) or even a high efficiency Variable Geometry Turbocharger (VGT).

The combination of a displacement type gas feeding device, a high efficiency turbo system and a fully variable valve actuation (VVA) system results in an engine operating with high efficiency and low NOx levels in all operating conditions.

The efficiency of the engine is further improved by handling and utilizing the exhaust pulses in the EGR displacement pump as described previously. Further improvements of the engine efficiency related to the exhaust pulses (along with other advantages) can be obtained by means of the freewheel mechanism in the driving connection between the displacement pump and the EGR drive unit as also described previously. Pulse utilization can also be applied to a turbine connected to the pressure charging system (i.e. the turbine of a turbocharging system). The engine can thus preferably be provided with a turbine (or several turbines) as well as an EGR pump that both are utilizing the dynamic energy from the blow down pulses generated when the exhaust valve opens.

The turbo turbine is preferably a high efficient pulse utilizing turbine with two volutes that are either sector dived with approximately 180 degree each or with an axial division where the two volutes enters the complete 360 deg in parallel. (e.g. one exhaust branch with a separate turbine inlet for cylinders 1-3 and one for cylinder 4-6, respectively, for a six-cylinder engine). These designs may also enable an improved component efficiency since turbines of these designs will have larger critical flow area than constant pressure turbines. Lager components enable higher efficiency. However, a plurality of turbines with one turbine for each exhaust branch may be the variant with the highest turbo efficiency due to perfect separation between the exhaust branches and thereby high pulse utilization. A high turbo efficiency leads to improved Miller concept efficiency.

To efficiently utilize the energy in the exhaust pulses the volume ratio between the pre-turbine exhaust and the cylinder displacement of the engine (for one cylinder) should be below 2.0 (e.g. <1 L exhaust volume and >0.5 L cylinder displacement volume for one cylinder). Further, this is the exhaust conduit volume for one exhaust branch (typically 2, 3 or 4 cylinders in one branch for a 4, 6 or 8 cyl engine) divided by the swept cylinder volume of one cylinder. The volume of the EGR conduit is excluded here. The exhaust volume is thus calculated as (for one branch): the sum of the exhaust ports, exhaust manifold & turbine volute volumes for that branch.

For best overall functionality the pulse utilizing turbine should have a high boosting efficiency while keeping back pressure low for best Miller cycle efficiency.

To utilize the exhaust pulses efficiently the cross-sectional area of the flow path from the exhaust port to the turbine inlet should not be too narrow. A minimum value for the ratio between the cross-sectional area and the exhaust conduit volume of one branch along the flow path may in some cases be 0.5 (i.e. min A_exh/V_exh).

To further enhance pulse utilization it is useful to "isolate" the pulses in the exhaust (besides the geometrical requirements mentioned above). Perfect isolation can be achieved with a separate turbine for each exhaust branch/exhaust cavity as mentioned above. This will have no cross flow area between the branches (for a single entry turbine housing). Second best pulse isolation can be achieved with a sector divided turbine. If it has a nozzle with divider all the way close to the turbine wheel, it will further reduce the cross flow area. Third best option is likely to be a twin entry turbine with axial division of the turbine inlets. A fourth option is a single entry turbine, with exhaust gas from all cylinders entering from the same exhaust manifold. This is also to some extent pulse utilizing.

According to a second aspect of the present invention, the object is achieved by a method according to the appended claims.

The method includes a first mode of operation and a second mode of operation.

The object is achieved by a method of improving efficiency of an internal combustion engine wherein the engine comprises a crankshaft, one or more cylinders including a cylinder head, a piston, a combustion chamber, one or more intake valves operated in accordance with late and/or early Miller-type valve timing, one or more exhaust valves, an intake system configured for feeding intake air to the engine, an exhaust system configured for conveying exhaust gas away from the engine, an exhaust gas recirculation (EGR) system including a gas feeding device in the form of a displacement pump connected to an EGR drive unit, wherein the gas feeding device is configured to feed exhaust gas branched off from the exhaust system through an EGR conduit and, downstream the gas feeding device, feed the branched off exhaust gas into the intake system, the engine further comprising a pressure charging system connected to the intake system. The method includes the steps of:

operating the internal combustion engine under such conditions that the pressure in the intake system exceeds or is substantially similar to the pressure in the exhaust system, and operating the gas feeding device to pressurise and thereby supply branched off exhaust gas to the intake system, or operating the internal combustion engine under such conditions that the pressure in the exhaust system is higher than the pressure in the intake system, configuring the EGR system and/or the EGR drive unit to be driven by the gas feeding device so as to generate a power output, and operating the engine so as to drive the gas feeding device by means of exhaust gas flowing from the exhaust system to the intake system and thereby operate the gas feeding device in an energy recovery mode where the EGR drive unit generates a power output.

By this, and as mentioned above under the first aspect, maintaining a low NOx emission level while at the same time lowering the fuel consumption in all operating conditions is achieved.

In some embodiments, the method according to the second aspect of the present invention as well as the control unit may be configured for switching between the first and the second mode of operation.

The second mode of operation has been found to be particularly beneficial in heavy-duty applications such as for e.g. excavators etc.

According to a further embodiment, the method of operating the internal combustion engine under such conditions that the pressure in the exhaust system is higher than the pressure in the intake system includes the step of:

conveying the power output to an energy reservoir such as a battery or a capacitor or conveying the power output to the engine.

According to a further embodiment, the method includes the step of:

in operating conditions wherein the pressure in the exhaust system is lower than the pressure in the intake system, or in operating conditions wherein a turbine of the pressure charging system operates below desired speed, operating the EGR system in reversed mode, or at least partially reversed mode, such that the gas feeding device supplies pressure to the pressure charging system.

By this, low end performance of the engine may be improved.

According to a further embodiment, the method includes the steps of:

operating a re-directing system configured to re-direct flow of exhaust gas from the gas feeding device to the turbine by operating valves in the re-directing system to close the EGR feed flow and opening any valves to pressure charging system.

According to a further embodiment of method of improving efficiency of an internal combustion engine, the engine is the internal combustion engine as described herein.

According to a further embodiment the method comprises the step of locking or unlocking a freewheel mechanism arranged in a rotatable drive connection between the gas feeding device and the EGR drive unit.

According to a third aspect, the present invention relates to an internal combustion engine configured to operate in accordance with the method of improving efficiency of an internal combustion engine.

According to a fourth aspect, the present invention relates to a computer program comprising program code means for performing the steps according to the present invention when executed on a computer or on an ECU.

According to a fifth aspect, the present invention relates to a computer readable medium carrying a computer program comprising program code means for performing the steps according to the method of improving efficiency of an internal combustion engine when said program product is run on a computer.

According to a sixth aspect, the present invention relates to a control unit configured to performing the steps according to the method of improving efficiency of an internal combustion engine when said program product is run on a computer. The control unit is connected to various devices in the engine for controlling the devices dependent on operating conditions, emission requirements as well as user input etc. Examples hereto are controlling the opening and closing of the intake valves via the valve actuating members, the gas feeding device and turbocharger dependent operating conditions and drive mode, e.g. feed mode, compound mode and reversed mode or at least partially reversed mode. With reference to the aspects and features described herein, the control unit may connected to: the pressure charging system, the valve in the wastegate system, the EGR valve, the EGR drive unit, the valve actuating devices, the bypass valve, the re-directing valves, the EGR cooler or EGR coolers and the energy reservoir; in any suitable combinations dependent on drive mode and embodiment.

According to one example embodiment of the sixth aspect, the control unit may be connected to sensors and actuators comprised in the engine according to the first aspect of the invention. The sensors provide control signals to the control unit to be used by the control unit to control the devices according to the invention. The sensors can be pressure and/or temperature sensor and/or flow sensors, position dependent sensors and/or any other suitable sensors that allows for control and operation of the engine.

According to a seventh aspect, the present invention relates to a vehicle comprising an internal combustion engine according to the present disclosure.

The additional aspects of the invention will achieve the same benefits as mentioned previously.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 3B;

DETAILED DESCRIPTION OF EXAMPLE EMBODIMENTS OF THE INVENTION

Figure 1:
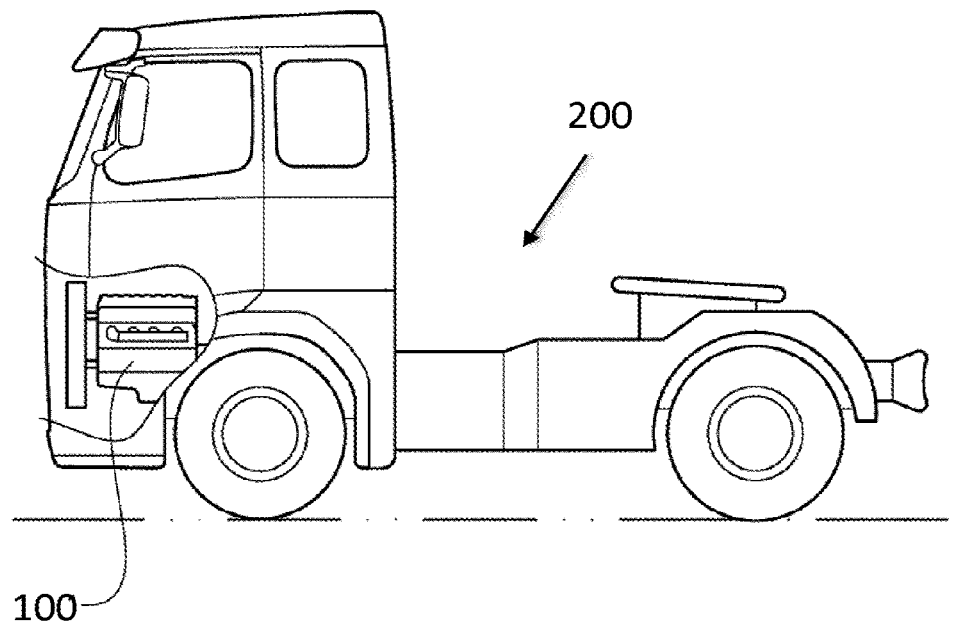
FIG. 1 is a schematic drawing showing a truck with an internal combustion engine according the first aspect of the invention.

It is to be understood, that the present invention is not limited to the embodiments described above and illustrated in the drawings; rather, the skilled person will recognize, that many changes and modifications may be made within the scope of the appended claims.

FIG. 1 is a schematic drawing showing a truck 200 with an internal combustion engine 100 according to an aspect of the present invention.

Figure 2:
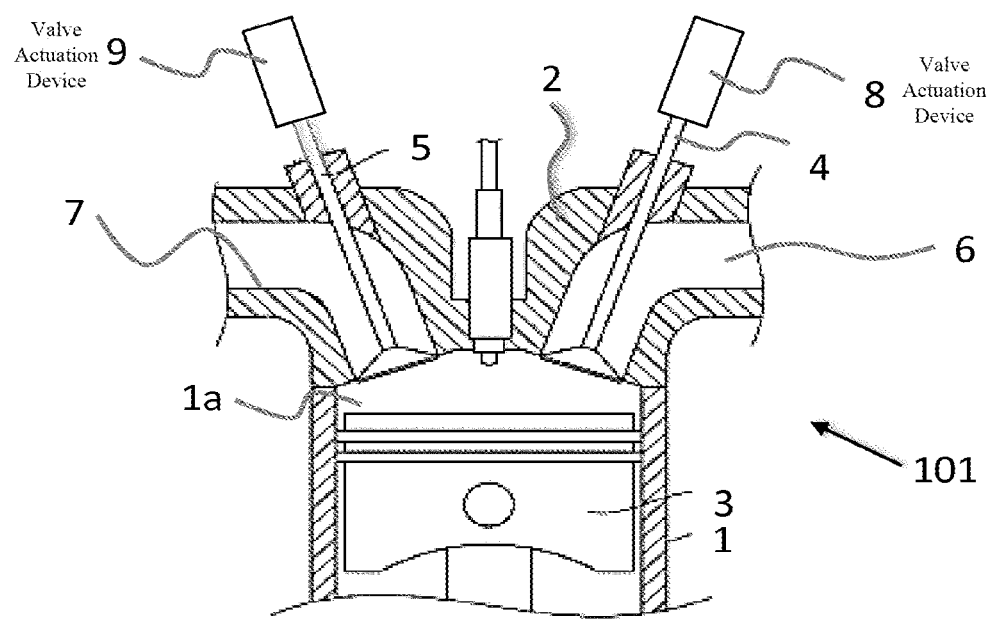
FIG. 2 is a schematic drawing showing, in a sectional view, a part of an internal combustion engine.

FIG. 2 is a schematic drawing showing, in a sectional cut-out view, a part of an internal combustion engine. In particular, the drawing shows the essential parts of a cylinder 101 of an embodiment of an internal combustion engine 100.

The internal combustion engine 100 may include one or more cylinders 101, and the cylinders 101 may be arranged in any configuration such in in-line, in a V, in flat/boxer configuration etc.

As can be seen in FIG. 2, each cylinder 1 includes a cylinder head 2, a piston 3 configured for reciprocating towards and away from the cylinder head 2 and a combustion chamber 1a located between the piston 3 and the cylinder head 2. Each cylinder 1 moreover includes one or more intake valves 4 arranged in association with the combustion chamber 1a and one or more exhaust valves 5 arranged in association with the combustion chamber 1a.

An intake system 6 for feeding intake air to the engine 100 is provided in connection with the intake valves 4, and an exhaust system 7 for conveying exhaust gas away from the engine 100 is provided in connection with the exhaust valves 5.

The intake valves 4 control inflow of intake air from the intake system 6 to the cylinder 1, and the exhaust valves 5 control exhaust of exhaust gas to the exhaust system 7 from the cylinder 1.

As shown in FIG. 2, the engine 100 may include a valve actuation device 8 configured for opening and closing the intake valve 4. The valve actuation device 8 may be configured for, or controlled to, allowing for late or early closing of the intake valve 4 according to the Miller-type valve timing principles. Similarly, the engine 100 may include a valve actuation device 9 configured for, or controlled to, opening and closing, or even late or early opening and closing, of the exhaust valve 5.

One or more of the valve actuating devices 8, 9 may be controlled to open or close the intake and exhaust valves 4, 5 according to predetermined and/or dynamic timing schedules; including early and late Miller-type valve timing. This will be explained further in the below.

In one embodiment, one valve actuation device 8, 9, operates one intake/exhaust valve 4, 5.

Figure 3A:
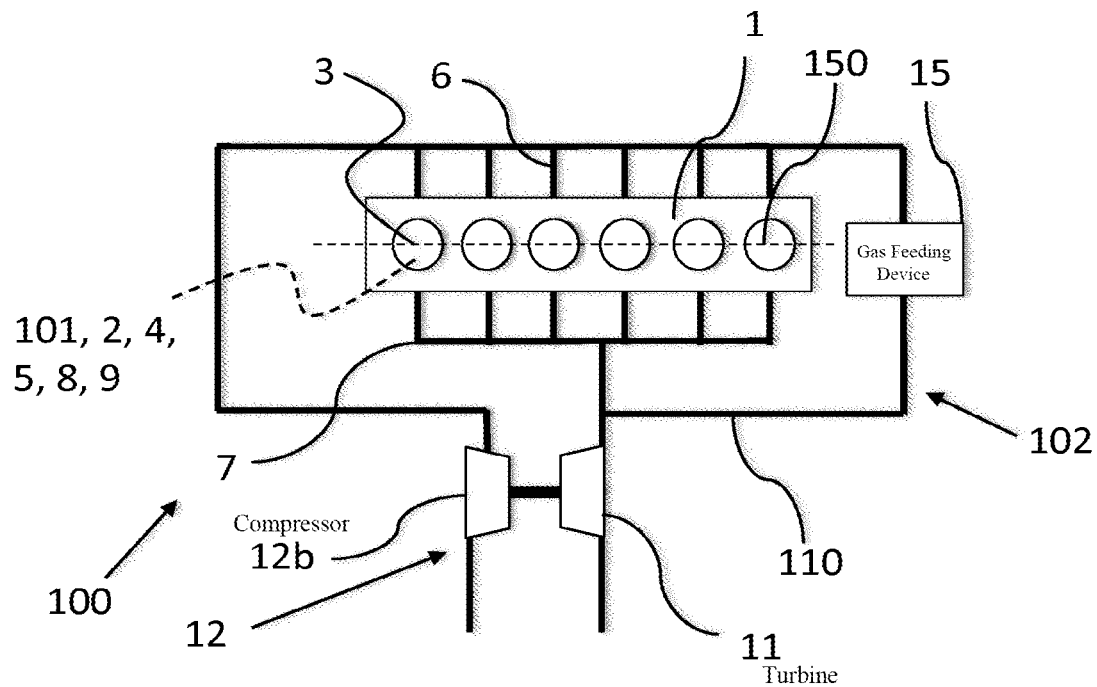
FIG. 3A is a schematic drawing showing elements of an internal combustion engine according to one example embodiment of the invention.

FIG. 3A schematically shows an internal combustion engine 100 according to one example embodiment of the invention. The engine 100 is an in-line six cylinder engine and the engine 100 includes the components shown in FIG. 2.

FIG. 3A further shows, that the intake system 6 is provided in connection with the intake valves 4, and that the exhaust system 7 is provided in connection with the exhaust valves 5.

An EGR system 102 is provided between the exhaust system 7 and the intake system 6. The EGR system includes a gas feeding device 15, or EGR displacement pump 15, and an EGR conduit 110 allowing for fluid communication between the exhaust system 7 and the intake system 6. The gas feeding device 15 is operative to feed and/or control flow of exhaust gas from the exhaust system 7 via the EGR conduit 110 to the intake system 6.

The gas feeding device/displacement pump 15 is arranged in the EGR conduit 110 between connection points where the EGR conduit 110 provides fluid communication with the exhaust system 7 (i.e. inlet to the EGR conduit 110) and the intake system 6 (i.e. outlet from the EGR conduit 110).

The gas feeding device 15 is operatively connected to, and may be driven by, an EGR drive unit 22 as described further below in relation to FIG. 3B.

The engine 100 further includes a pressure charging system 12 connected to the intake system 6, for, in certain operating conditions of the engine 100, pressurising the intake air to a pressure above the pressure in exhaust system 7. In FIG. 3A the pressure charging system 12 is a turbocharger comprising a turbine 11 and a compressor 12b. The turbine 11 is operative to drive the compressor 12b via a shaft.

The EGR system 102 is a high pressure EGR system where exhaust gas is branched off from the flow of exhaust gas upstream the turbine 11.

The compressor 12b is arranged to pressurise air in the intake system 6 dependent on operating conditions of the engine 100 and, when required, provide a positive pressure differential, or pressure differential, between the intake system 6 and the exhaust system 7 while operating with late or early Miller-type valve timing, such that the pressure in the intake system 6 exceeds the pressure in the exhaust system 7.

A so called wastegate may be provided to divert exhaust gas away from the turbine 11 in order to regulate turbine speed as discussed below with reference to FIG. 3B.

The pressurised intake air may be cooled in a cooler such as a charge air cooler, or intercooler, as discussed below with reference to FIG. 3B.

During operation of the engine 100, a portion of the exhaust gas is branched off from the flow of exhaust gas flowing in exhaust system 7, upstream the turbine 11, to the EGR system 102. The remaining exhaust gas is conveyed to the turbine 11 of the turbocharger. The exhaust gas branched off from the stream of exhaust gas is, via EGR conduit 110, led to the gas feeding device 15 and, in certain operating conditions, the gas feeding device 15 pressurises the exhaust gas to a pressure level at least corresponding to the absolute pressure level in the intake system 6; this in order to allow for flow of exhaust gas from the exhaust system 7 to the inlet system 6 irrespective of the pressure differential between the exhaust system 7 and the intake system 6.

Flow of gas in the EGR conduits 110 may be controlled by one or more EGR valves 10 as discussed below with reference to FIG. 3B.

Figure 3B:
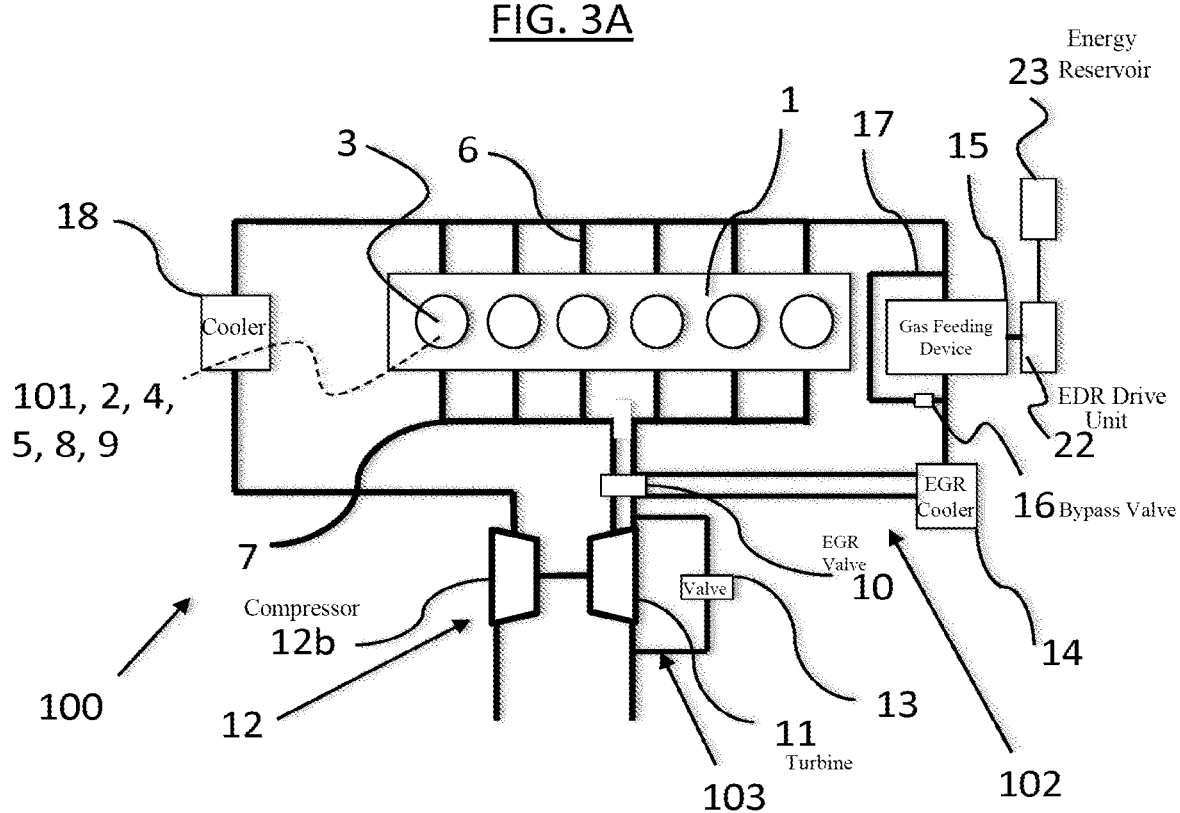
FIG. 3B is a schematic drawing showing the elements of an internal combustion engine according to FIG. 3A, however including additional features.

FIG. 3B schematically shows an internal combustion engine 100 according to one example embodiment of the invention. The engine 100 includes the components shown in FIGS. 2 and 3A however with additional features.

The exhaust system 7 is in this embodiment separated into two sections; one section for cylinders 1, 2 and 3 and one section for cylinders 4, 5 and 6; as counted from the left hand side of the drawing. The two sections of the exhaust system 7 may convey exhaust gas through an EGR valve 10 arranged to ensure that a part of the exhaust gas is branched off from the exhaust system 7 and further to control the volume of exhaust gas returned to the intake system 6 as EGR. The remaining exhaust gas is further conveyed to the turbine part 11 of the turbocharger. The turbine 11 and the geometry of the exhaust gas system are preferably designed for pulse utilization in line with what has been described previously in this disclosure.

A wastegate system 103 may be provided to divert exhaust gas away from the turbine 11 in order to regulate turbine speed. The wastegate system 103 includes a valve 13 operative to bypass excess pressure, or excess flow of exhaust gas, around the turbine 11 in order to regulate maximum boost pressure delivered by the pressure charging system 12.

The pressurised intake air may be cooled in a cooler 18 such as a charge air cooler or intercooler. The cooler 18 increases the efficiency of the pressure charging system by reducing, or removing a part of, induction air heat and compression heat added to the compressed intake air by the pressure charging system 12. By this, volume density of the intake air is increased.

The exhaust gas branched off from the exhaust system 7 may be conveyed, possibly via an EGR valve 10 and/or an EGR cooler 14, to the gas feeding device 15 for pressurisation to a pressure level at least corresponding to the pressure in the intake system 6.

In operating conditions wherein the pressure in the exhaust system 7 is sufficiently high, pressurisation by means the gas feeding device 15 may be unnecessary—and the gas feeding device 15 may be bypassed via a bypass conduit 17. A bypass valve 16 may be provided for controlling the flow in the bypass conduit 17. In FIG. 3B, the bypass valve 16 is arranged in the bypass flow line 17. Alternatively, or additionally, the gas feeding device 15 may in such conditions also operate freely with the flow of EGR gas.

Separation of the exhaust systems 7 according to the embodiment shown in FIG. 3B allows for preservation of pressure pulses in the exhaust system 7. One benefit of this configuration is, that the preserved pressure pulses are conveyed to the turbine 11 thereby propelling the turbine 11 also in operating conditions resulting in low or insufficient pressure in the exhaust system 7 to propel the turbine 11. Additionally, a non-separated exhaust system, as shown in FIG. 3A, provides higher exhaust backpressure and thus lower volumetric efficiency and increased residuals in the cylinder 1.

The EGR valve 10 may be configured for branching off exhaust gas from one, both or multiple exhaust branches; hence the EGR valve 10 may constitute a multi-function or dual valve. In some embodiments, the EGR valve 10 may be configured for branching off exhaust gas from only one section of the exhaust system 7. This may, however, skew the engine operation and result in an uneven distribution of exhaust gas between the cylinders 1.

The gas feeding device 15 is a displacement type pump operatively connected to an EGR drive unit 22. The EGR drive unit 22 may be configured to drive the gas feeding device 15 in a feed mode to feed exhaust gas into the intake system 6.

The EGR drive unit 22 may furthermore be configured to generate power output in a compound mode of operation (driven mode); i.e. in an energy recovery mode of operation. The compound mode is applicable, or available, when the engine operating conditions result in higher pressure in the exhaust system 7 than in the intake system 6; i.e. in a negative differential between exhaust system 7 and intake system 6. When the engine 100 is operating in such condition, natural flow of exhaust gas from the exhaust system 7 to the intake system 6 may take place while driving the gas feeding device 15 and the EGR drive unit 22—and thus allow for operation in compound mode.

The EGR drive unit 22 is in this example an electric motor capable of operating as a generator in a reversed drive mode. Alternatively, the EGR drive unit may constitute a mechanical drive such as a belt, chain or gear drive or a hydraulic or pneumatic drive, preferably connected to the crankshaft 150.

According to one example embodiment shown in FIG. 3B, an energy reservoir 23, such as a battery or a capacitor, is connected to the EGR drive unit 22, for storing energy in compound mode.

The EGR drive unit 22 may furthermore be configured to drive the gas feeding device 15 in reverse to provide pressure towards the turbine 11 in order to spin up the compressor 12b. In this manner, it is possible to improve low end performance of the engine 100. Reverse mode may be applied irrespective of the differential pressure between the exhaust system 7 and the intake system 6.

Figure 3C:
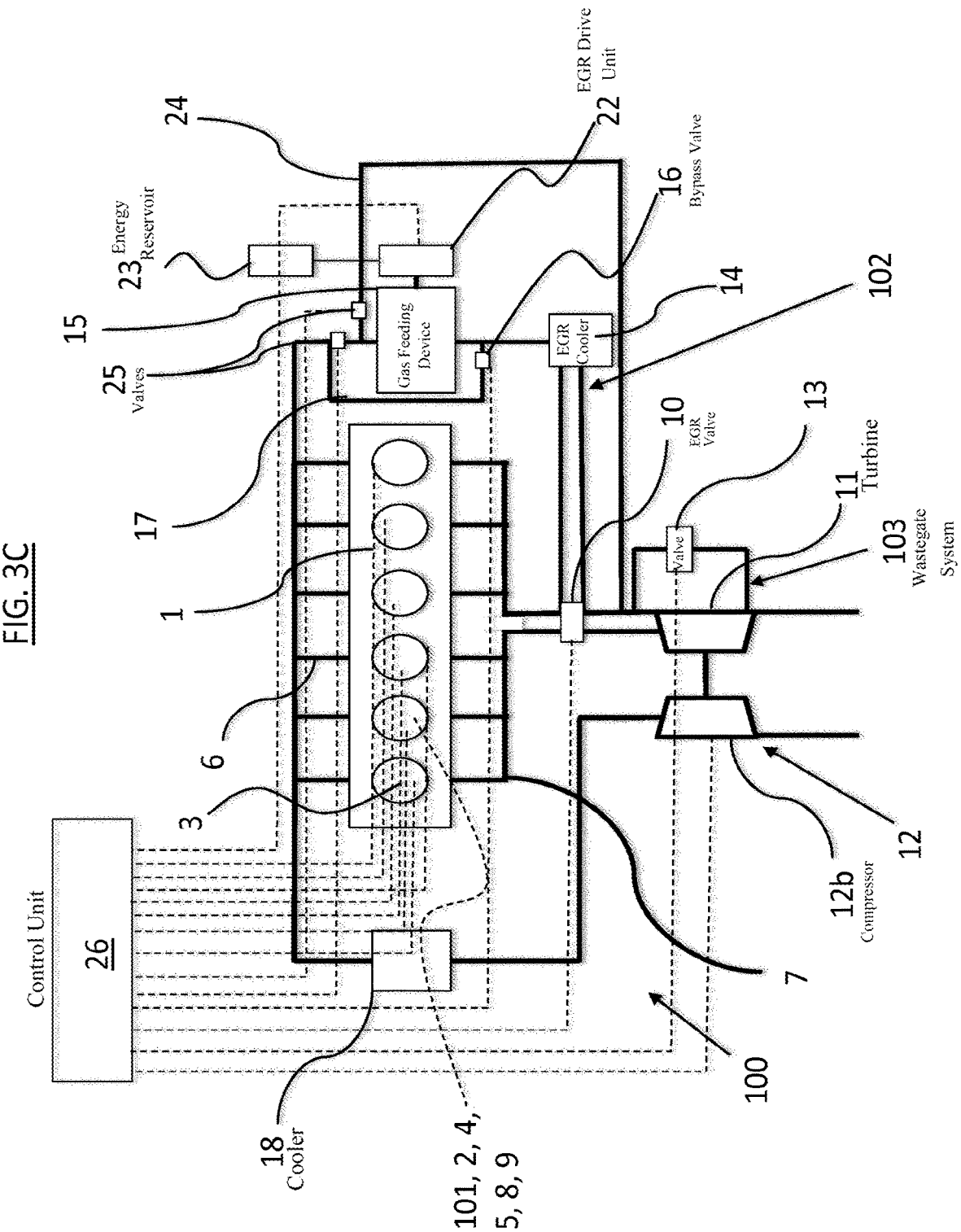
FIG. 3C schematically shows a further example embodiment of the internal combustion engine according to FIG. 3B.

FIG. 3C schematically shows an embodiment of an engine 100 according to FIG. 3B, however with additional features and configured for reverse drive mode of the EGR system 102.

In FIG. 3C the EGR system 102 is provided with a gas re-directing system 24 configured to re-direct the flow from the gas feeding device 15 from its normal feed direction via the re-directing system 24 to the turbine 11. The flow direction is controlled through (re-directing) valves 25 configured for closing the EGR feed flow while opening for flow to the pressure charging system 12.

The re-direction system 24 may include conduits interconnecting the valves 25, so that the flow from the gas feeding device 15 may be re-directed from its normal route and through the piping to the turbine 11. The valves 25 may be connected to a control unit 26, or ECU, configured to control opening and closing of the valves 25 dependent on drive mode.

FIG. 3C further shows that the control unit 26 may be operative to control various devices in the engine 100. The control unit 26 may be configured for obtaining various input signals from a plurality of not shown sensors. Control of the devices may depend on operating conditions and performed in response to software stored in a memory held in the control unit. As an example, the control unit may be operative to control opening and closing of the intake valves 4 via the valve actuating members 8, the gas feeding device and turbocharger; in dependence with operating conditions, user input and drive mode including e.g. feed mode, compound mode and reversed, or at least partially reversed, mode etc.

In FIG. 3C the control unit 26 is, as shown, operative to control the pressure charging system 12, the valve 13 in the wastegate system 103, the EGR valve 10, the EGR drive unit 22, the valve actuating members 8, 9, the bypass valve 16, the valves 25 in the re-directing system 24 etc.

It should be noted, that the control unit 26 may be operative to control one or more devices as required and dependent on the chosen embodiment of the present invention. The control unit 26 may be operative to communicate with additional controllers and communication gateways etc.

FIG. 3C moreover shows, that the EGR system 102 may be connected to an EGR valve arranged in the exhaust gas system 7 upstream turbine 11; hence a high-pressure EGR system 102 is shown.

Figure 3D:
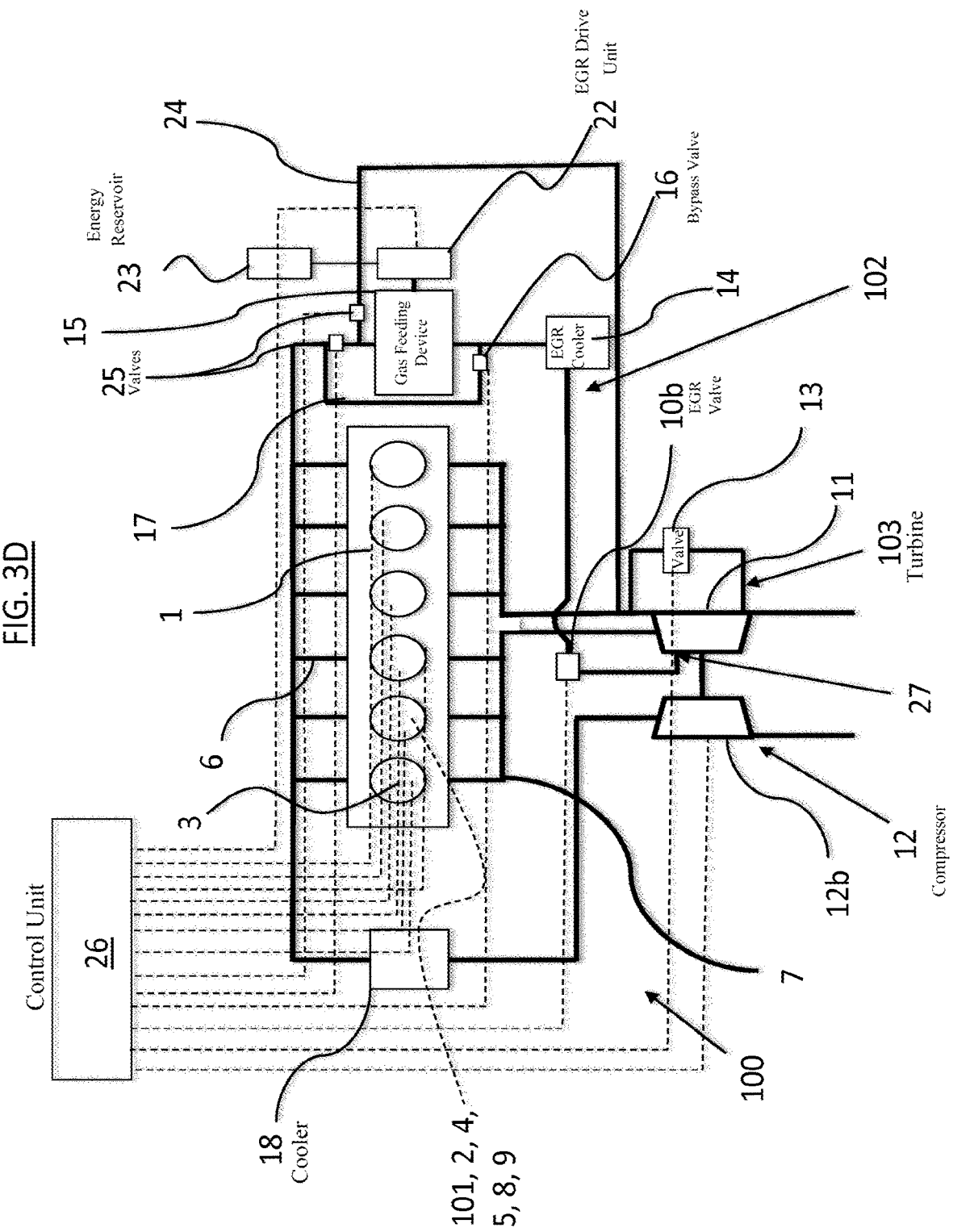
FIG. 3D schematically shows a further example embodiment of an internal combustion engine.

FIG. 3D schematically shows a further example embodiment of an engine 100.

In FIG. 3D it is shown, that the EGR system 102 is connected to an outlet 27 arranged on the turbine 11, and that an EGR valve 10b is arranged to control EGR flow to the gas feeding device 15.

In additional and not shown embodiments of the present invention, exhaust gas for the EGR system 102 may be branched off downstream the turbine 11 including from a section of the exhaust gas treatment systems.

As indicated in FIGS. 3B-3D the gas feeding device 15 is connected to the EGR drive unit 22 via a rotatable drive connection. Although not illustrated in the figures, this connection comprises a first shaft member connected to the EGR drive unit 22 and a second shaft member connected to the gas feeding device 15. The first and second shaft members may be fixedly connected to each other but in this example they are connected via a freewheel mechanism (not shown) configured to allow the second shaft member to rotate at a higher speed than the first shaft member in an operation mode where the first shaft member forms a driving shaft and the second shaft member forms a driven shaft and exhaust gas is fed through the EGR conduit 110. Rotary parts in the displacement pump 15 can thus rotate faster than the driving shaft of the EGR drive unit 22, which for instance allows the displacement pump 15 to increase its speed when an exhaust pulse passes and to rotate with the EGR flow even if the EGR drive unit 22 is turned off, as described more in detail further above in this disclosure. The freewheel mechanism is provided with a locking function configured to rotationally lock the first and second shaft members to each other. The control unit 26 is configured to control also locking and unlocking of the freewheel mechanism.

Figure 4:
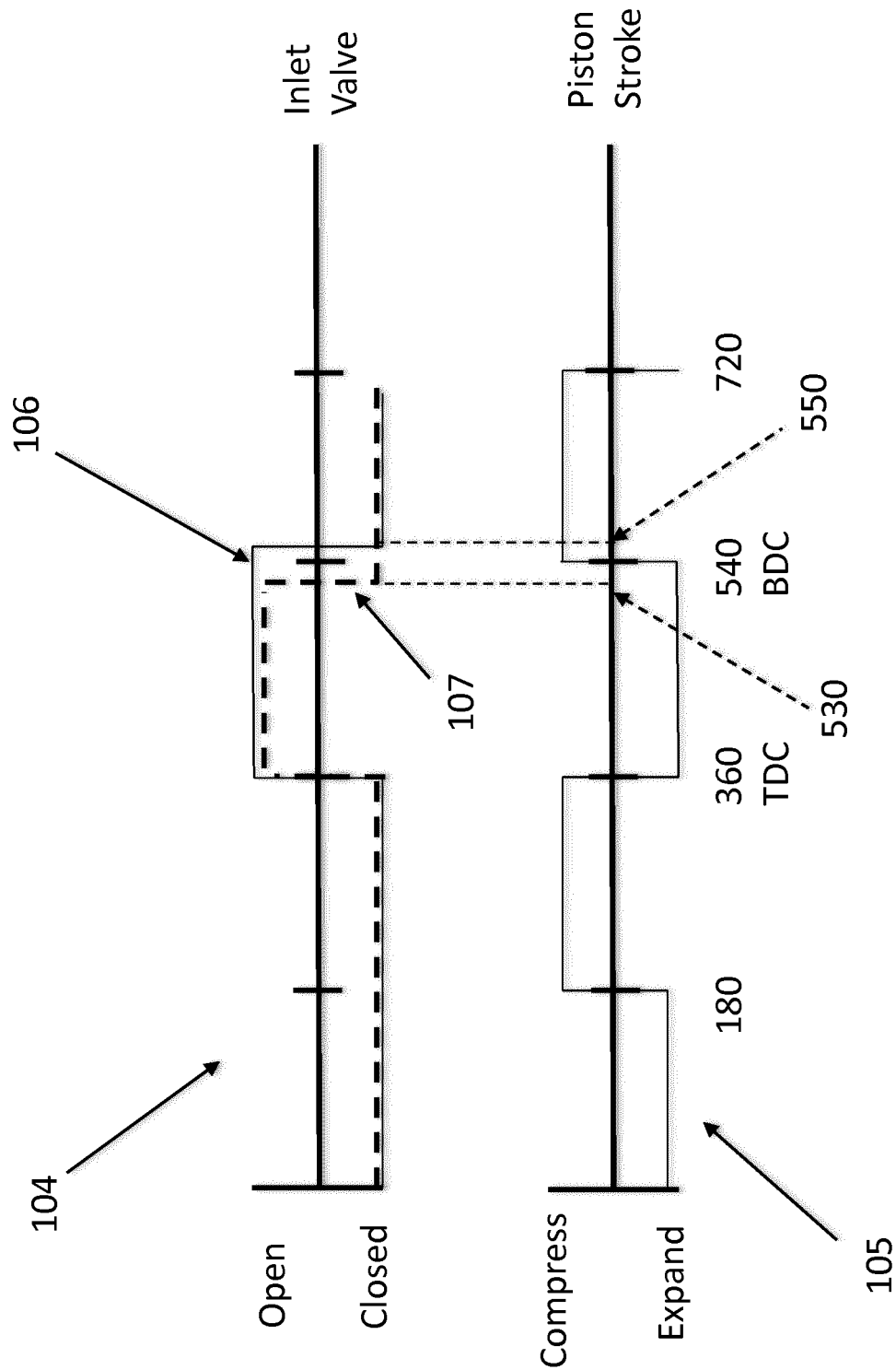
FIG. 4 is a schematic drawing showing intake valve opening and closure relative to CAD (Crank Angle Degree) for late and early Miller cycle operation.

FIG. 4 schematically shows the principles of late and early Miller-type valve timing for one cylinder 1 according to the present invention.

The upper diagram 104 represents opening and closing profiles of an intake valve.

The lower diagram 105 represents the piston stroke between top dead centre (TDC) at 360 CAD (Crank Angle Degree starting from 0 degree at commence of the expansion stroke) and the bottom dead centre (BDC) at 540 CAD.

The solid line 106, in the upper diagram, represents late Miller-type valve timing. As can be seen, in late Miller-type valve timing, the intake valve opens at approximately 360 CAD and closes at approximately 550 CAD, i.e. after the BDC at 540 CAD; thereby representing late valve closure.

The broken line 107, in the upper diagram, represents early Miller-type valve timing. As can be seen, the intake valve opens at approximately 360 CAD and closes at approximately 530 CAD, i.e. before BDC at 540 CAD; thereby representing an early valve closure.

It should be noted, that FIG. 4 only shows one example of late and early Miller-type valve timing. Depending on different operating conditions, different timing for opening and closing of the inlet valve may be applied without departing from the scope of the present invention.

According to one example embodiment of the invention, late Miller-type valve timing may be applied by closing the intake valve in the range of 540 CAD to 680 CAD, preferably 540 CAD to 640 CAD, more preferred in the range of 540 CAD to 600 CAD and most preferred in the range of 540 CAD to 580 CAD. The selection of the desired range will depend on operating conditions, where the abovementioned ranges have shown desirable results.

According to one example embodiment of the invention, early Miller-type valve timing may be applied by closing the intake valve in the range of 500 CAD to 540 CAD, preferably in the range of 520 CAD to 540 CAD and most preferred in the range of 530 CAD to 540 CAD. The selection of the desired range will depend on operating conditions, where the above-mentioned ranges have shown desirable results.

There are different valve actuation systems available, including valve actuation devices 8, 9 that allows for early and/or late Miller-type valve timing. The actuation systems may be fixed valve actuation systems or variable valve actuation systems. A valve actuation system per se is known in the art and any suitable valve actuation system can be used for late and early Miller-type valve timing in the context of the present invention.

Late Miller-type valve timing keeps the intake valve open longer than the "optimum" at BDC for a traditional four-stroke engine (Otto or Diesel), and thereby increases volumetric efficiency. The effect of this is that the charge gases, i.e. intake air and EGR, are pushed back into the intake system by the piston; hence in effect acting as a pressure charging system to increase the intake system pressure. This increases pumping work, but it also adds thermal transfer in cylinder and intake ports.

Early Miller-type valve timing, intake valve closes before the BDC and has the advantage of less losses than late Miller. Both early and late Miller have the advantage of increased efficiency of the engine by offering the same effective compression ratio and a larger expansion ratio.

Figure 5:
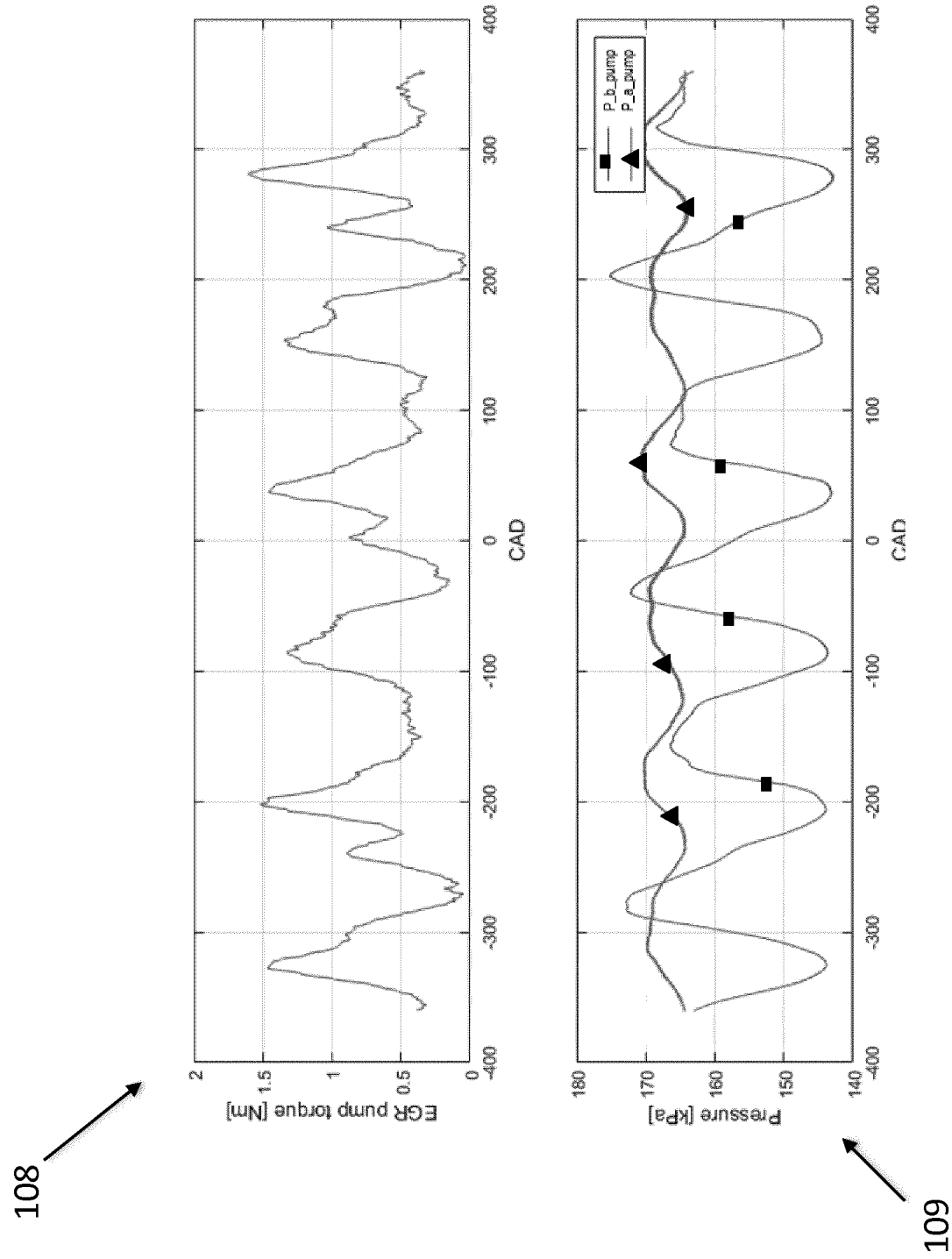
FIG. 5 is a graphical representation of torque load and pressure conditions relating to a gas feeding device/displacement pump arranged in an EGR conduit during operation of the engine according to e.g.

FIG. 5 is a graphical representation of torque load and pressure conditions relating to the gas feeding device/displacement pump 15 during operation of the engine 100.

The chart 108 shows effective torque load by the gas feeding device 15 (feed mode) as a function of CAD.

The chart 109 shows pressure levels $P_{before\ gas\ feeding\ device\ 15}$ (P_b_pump in chart) and $P_{after\ gas\ feeding\ device}$ (P_a_pump in chart)

The pressure before and after the gas feeding device 15 is the pressure at the inlet and the outlet, respectively, of the device 15 and, as described below, the pressure at the inlet is substantially the same as in the exhaust manifold/system 7 and the pressure at the outlet is substantially the same as in the intake system 6.

A pressurised intake system may, as mentioned above, include a cooler 18 such as an intercooler. Typically, during flow through the cooler, a few kPa of charge pressure is lost, meaning that the boost pressure in the intake system 6 will be slightly lower than the boost pressure just downstream the compressor 12b. The gas feeding device 15 works, in feed mode, towards the intake system 6, meaning that the pressure at the outlet of the gas feeding device 15 will be substantially equivalent to the boost pressure in the intake system. The pressure at the inlet of the gas feeding device 15 is typically slightly lower than the exhaust manifold pressure; typically a few kPa, because of some pressure drop over the EGR valve and the EGR cooler (if such components are present). The pressure drops are flow dependant, so for very low flows, the pressure drops are basically none. The gas feeding device 15 basically has the same pressure ratio as present over the engine, but with the pressure drop in the EGR cooler+EGR valve+piping added:

$$\Delta P\ \text{gas feeding device} = (P\ \text{Intake System} - P\ \text{Exhaust System}) + \Delta P\ \text{EGR system}$$

When the gas feeding device 15 constitutes a displacement pump, it will add or receive work only when there is a pressure difference across the pump. This is due to the fact, that the displacement pump has no internal compression.

The preferred type of displacement pump is a Roots pump (blower), which has a continuous flow compared to intermittent flow. This means that the flow is not interrupted and flows continuously into the intake system 6 of the engine 100.

As the gas feeding device 15 is performing work only when there is a higher pressure on the outlet than on the intake side, work is carried out by the gas feeding device 15 when needed only. Similarly, when an exhaust pressure pulse reaches the intake of the gas feeding device 15, no pump work is needed. During such scenarios, exhaust gas is merely transported by the gas feeding device 15 to its outlet without adding work or compressing gas. This is illustrated in FIG. 5 where it is shown that when the exhaust pulses reach the gas feeding device 15 and the pressure gets high (chart 109) the pump torque decreases (chart 108). Exhaust pulses are thus utilized to reduce the power required for driving the gas feeding device 15. This increases the overall engine efficiency. The freewheel function for the gas feeding device 15 can be used as described previously to further utilize the energy of the exhaust pulses and further increase the engine efficiency.

In addition to this, it is possible to extract energy from the gas feeding device when the pressure difference is negative. This has been explained in greater detail with reference to FIGS. 3B and 3C.

Figure 6A:
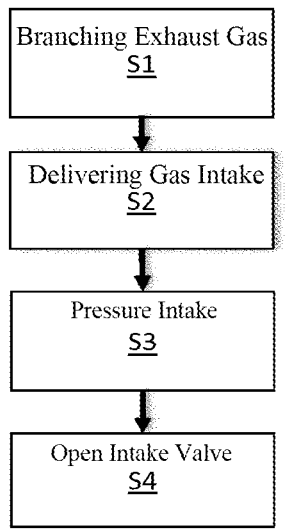
FIG. 6A is a flowchart illustrating a method of improving efficiency of an internal combustion engine according to one example embodiment of the present invention.

FIG. 6A schematically illustrates the main steps of operating the internal combustion engine according to the present invention. The steps are described with reference to the internal combustion engine as described with reference to FIGS. 1-5. The steps are:

step S1: branching off a part of the exhaust gas stream from the exhaust system 7 to be returned to the intake system 6 via the EGR system 102, step S2: delivering the branched off exhaust gas stream to the intake system 6, step S3: pressurising the intake system 6 via the pressure charging system 12 to a level above the exhaust gas pressure, step S4: opening the intake valve 4 of the cylinder 1 and maintaining the intake valve 4 open for late or early closing of the intake valve 4.

According to one example embodiment of step S4, the step of late closing relates to keeping the intake valve open until the crankshaft 150 reaches the range of 540 CAD to 680 CAD, preferably the range of 540 CAD to 640 CAD and more preferred the range of 540 CAD to 600 CAD and most preferred the range of 540 CAD to 580 CAD.

According to one example embodiment of step S4, the step of early closing relates to keeping the intake valve open the crankshaft 150 reaches the range of 500 CAD to 540 CAD, preferably the range of 520 CAD to 540 CAD and most preferred the range of 530 CAD to 540 CAD.

Figure 6B:
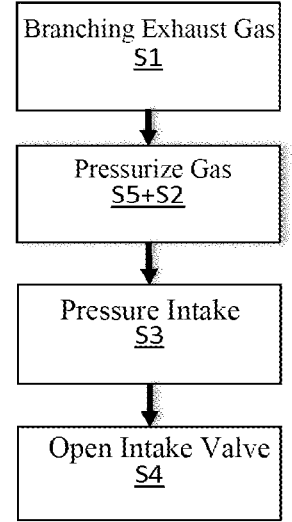
FIGS. 6B-6F are flowcharts illustrating methods of improving efficiency of an internal combustion engine according to further example embodiments of the present invention.

FIG. 6B schematically shows an example embodiment of the method shown in FIG. 6A; however with the step of:

step S5: prior to S2, pressurising the branched off part of the exhaust gas by operating the gas feeding device 15 in feed mode in dependence of operational parameters of the engine 100 as well as different modes of operation.

Figure 6C:
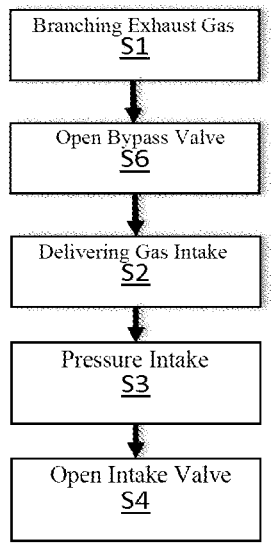

FIG. 6C schematically shows an example embodiment of the method shown in FIG. 6A; however, in operating conditions wherein the exhaust gas pressure is higher than the intake pressure. The embodiment incudes the further step of:

step S6: opening the bypass valve 16 thereby bypassing the gas feeding device when the exhaust gas pressure in the exhaust system 7 exceeds the pressure in the intake system 6.

Figure 6D:
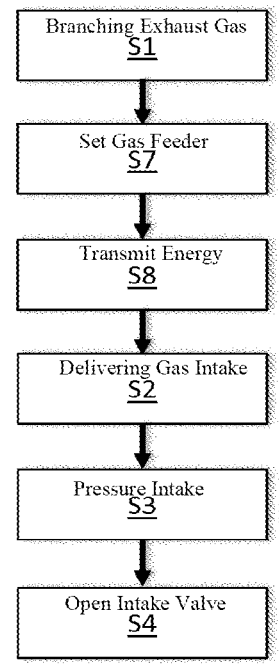

FIG. 6D schematically shows an example embodiment of the method shown in FIG. 6A with further steps of:

step S7: setting the gas feeding device 15 in compound mode to generate power output when the exhaust gas pressure in the exhaust system 7 is higher than the pressure in the intake system 6 to drive the gas feeding device 15 and thereby the EGR drive unit 22.

step S8: transmitting energy to an energy reservoir, e.g. a battery or a capacitor, connected to the EGR drive unit 22 or transferring energy to the engine 100.

Figure 6E:
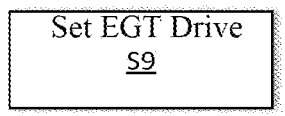

FIG. 6E schematically shows an example embodiment of the method according to the invention wherein the method is configured to provide pressure towards the pressure charging system 12.

The method includes the steps of:

step S9: setting the EGR drive unit 22 to drive the gas feeding device 15 to provide pressure towards the pressure charging system 12.

In this embodiment, the gas feeding device 15 may draw supply gas from the intake system or from the exhaust system.

Figure 6F:
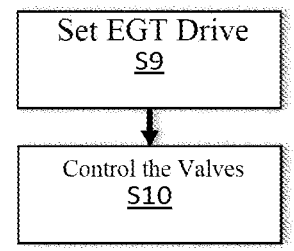

FIG. 6F schematically shows an example embodiment of the method shown in FIG. 6A, alternative to the method shown in FIG. 6E, and with a further step of:

step S10: controlling valves 25 in the re-directing system 24 to close EGR feed and opening the valve 25 controlling flow to the pressure charging system 12.

Figures 7A, 7B:
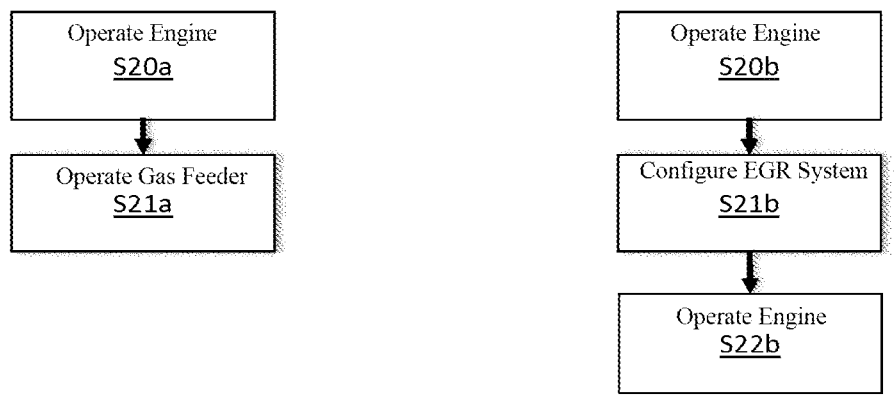
FIG. 7A is a flowchart illustrating a first mode of operation of a method of improving efficiency of an internal combustion engine in accordance with the second aspect of the present invention.
FIG. 7B is a flowchart illustrating a second mode of operation of a method of improving efficiency of an internal combustion engine in accordance with the second aspect of the present invention.

FIGS. 7A and 7B schematically show flowcharts illustrating two modes of operation of an internal combustion engine 100 operated in accordance with the second aspect of the present invention. The second aspect of the present invention relates to a method of improving efficiency of an internal combustion engine.

FIG. 7A is a flowchart illustrating the first mode of operation; the first mode includes the steps of:

step S20a: operating the internal combustion engine 100 under such conditions that the pressure in the intake system 6 exceeds, or is substantially similar to, the pressure in the exhaust system 7, step S21a: operating the gas feeding device 15 to pressurise and thereby supply branched off exhaust gas to the intake system 6.

FIG. 7B is a flowchart illustrating the second mode of operation; the second mode includes the steps of:

step S20b: operating the internal combustion engine 100 under such conditions that the pressure in the exhaust system 7 is higher than the pressure in the intake system 6, and, step S21b: configuring the EGR system 102 and/or the EGR drive unit 22 to be driven by the gas feeding device 15 so as to generate a power output, step S22b: operating the engine 100 so as to drive the gas feeding device 15 by means of exhaust gas flowing from the exhaust system 7 to the intake system 6 and thereby operate the gas feeding device 15 in an energy recovery mode where the EGR drive unit 22 generates a power output.

In some embodiments, the method according to the second aspect of the present invention may be configured for switching between the first and the second mode of operation.

It is to be understood that the present invention is not limited to the embodiments described above and illustrated in the drawings; rather, the skilled person will recognize that many changes and modifications may be made within the scope of the appended claims.

The invention claimed is:

1. An internal combustion engine comprising a crankshaft, a cylinder including a cylinder head, a piston, a combustion chamber, an intake valve, an exhaust valve, an intake system configured for feeding intake air to the internal combustion engine, an exhaust system configured for conveying exhaust gas away from the internal combustion engine, a pressure charging system connected to the intake system and an exhaust gas recirculation (EGR) system arranged to feed branched off exhaust gas from the exhaust system to the intake system via an EGR conduit, wherein the internal combustion engine includes a valve actuation device configured to allow for late or early closing of the intake valve in accordance with late or early Miller-type valve timing, wherein the EGR system includes a gas feeding device configured to feed exhaust gas through the EGR conduit in modes of operation where a pressure in the intake system exceeds a pressure in the exhaust system, wherein the gas feeding device is a displacement pump and wherein the gas feeding device is arranged so that exhaust gas recirculating in the EGR system during operation of the internal combustion engine passes the gas feeding device before being mixed with intake air in the intake system, wherein the gas feeding device is connected to an EGR drive unit,
wherein the gas feeding device is connected to the EGR drive unit via a rotatable drive connection, and
wherein the rotatable drive connection comprises a first shaft member connected to the EGR drive unit and a second shaft member connected to the gas feeding device, wherein the first and second shaft members are connected via a freewheel mechanism configured to allow the second shaft member to rotate at a higher speed than the first shaft member in an operation mode, where the pressure in the exhaust system is higher than the pressure in the intake system at least when an exhaust gas pressure pulse is generated, and the first shaft member forms a driving shaft and the second shaft member forms a driven shaft as the exhaust gas pressure pulse reaches the gas feeding device from the exhaust system, thereby the gas feeding device is driven by the exhaust gas flowing from the exhaust system without drive input from the EGR drive unit to reduce power consumption by the gas feeding device.

2. The internal combustion engine according to claim 1, wherein the internal combustion engine further includes an EGR bypass conduit arranged to bypass the gas feeding device.

3. The internal combustion engine according to claim 1, wherein the EGR system includes an EGR valve configured for controlling flow of gas in the EGR system 1.

4. The internal combustion engine according to claim 1, wherein the EGR system includes an exhaust gas cooler arranged upstream or downstream the gas feeding device.

5. The internal combustion engine according to claim 1, wherein the gas feeding device is configured for pressurizing the EGR system based on a pressure differential between the intake system and the exhaust system, and a pressure drop in the EGR system.

6. The internal combustion engine according to claim 1, wherein the gas feeding device is of a Roots blower type having a pair of rotary members provided with meshing lobes.

7. The internal combustion engine according to claim 1, wherein the EGR drive unit is configured to be driven by the gas feeding device to generate a power output.

8. The internal combustion engine according to claim 7, wherein the power output from the EGR drive unit is used for operating the internal combustion engine in a compound mode.

9. The internal combustion engine according to claim 7, wherein the internal combustion engine, the gas feeding device and the EGR drive unit are configured for operation in a first mode and in a second mode wherein, in the first mode, the gas feeding device and the EGR drive unit are configured for feeding exhaust gas into the intake system by pressurizing the exhaust gas, and, in the second mode, supplying pressure to the pressure charging system.

10. The internal combustion engine according to claim 9, wherein the internal combustion engine further includes a gas re-directing system configured for conveying gas pressurized by the gas feeding device to the pressure charging system.

11. The internal combustion engine according to claim 10, wherein the internal combustion engine further includes one or more flow control valves operative to control the flow of gas in the gas re-directing system.

12. The internal combustion engine according to claim 1, wherein the EGR drive unit constitutes an electrical motor or a mechanical drive connected to the crankshaft.

13. The internal combustion engine according to claim 1, wherein the EGR drive unit is configured for transferring energy to the internal combustion engine or to an energy reservoir.

14. The internal combustion engine according to claim 1, wherein the valve actuation device configured for operating the intake valve is a variable valve actuation device.

15. The internal combustion engine according to claim 1, wherein the valve actuation device is configured or controlled to keep the intake valve open until the crankshaft reaches the range of 580 Crank Angle Degree (CAD) to 680 CAD.

16. The internal combustion engine according to claim 1, wherein the valve actuation device is configured or controlled to keep the intake valve open until the crankshaft reaches the range of 500 Crank Angle Degree (CAD) to 560 CAD.

17. The internal combustion engine according to claim 1, wherein the pressure charging system is configured for establishing the pressure in the intake system which is higher than the pressure in the exhaust system.

18. The internal combustion engine according to claim 1, wherein the pressure charging system comprises a pressure charger, the pressure charger being one of a single turbocharger, a twin turbocharger system, a variable geometry turbine, and a turbo compound unit.

19. The internal combustion engine according to claim 1, wherein the EGR conduit is arranged to connect to the exhaust system at a first connection point and arranged to connect to the intake system at a second connection point and wherein the gas feeding device is arranged in the EGR conduit between said first and second connection points.

20. The internal combustion engine according to claim 1, wherein the freewheel mechanism is provided with a locking function configured to rotationally lock the first and second shaft members to each other.

21. The internal combustion engine according to claim 1, wherein the pressure charging system comprises a compressor arranged in the intake system and a turbine arranged in the exhaust system and wherein the EGR conduit is arranged to connect to the intake system downstream the compressor and to connect to the exhaust system upstream the turbine so as to form a high pressure EGR system.

22. A method of improving efficiency of the internal combustion engine according to claim 1, wherein the method includes:
operating the internal combustion engine under such conditions that the pressure in the intake system exceeds or is similar to the pressure in the exhaust system,
operating the gas feeding device to pressurize and thereby supply the branched off exhaust gas to the intake system,
operating the internal combustion engine under such conditions that the pressure in the exhaust system is higher than the pressure in the intake system, and
operating the internal combustion engine so as to drive the gas feeding device by means of exhaust gas flowing from the exhaust system to the intake system and thereby operate the gas feeding device in an energy recovery mode where the EGR drive unit generates a power output.

23. The method according to claim 22, wherein the method of operating the internal combustion engine under such conditions that the pressure in the exhaust system is higher than the pressure in the intake system includes:
conveying the power output to an energy reservoir.

24. The method according to claim 22, wherein the method includes:
- in operating conditions wherein the pressure in the exhaust system is lower than the pressure in the intake system, or in operating conditions wherein a turbine of the pressure charging system operates below a desired speed, operating the EGR system in an at least partially reversed mode such that the gas feeding device supplies pressure to the pressure charging system.

25. The method according to claim 24, wherein the method includes:
- operating a re-directing system configured to re-direct flow of exhaust gas from the gas feeding device to the turbine by operating valves in the re-directing system to close an EGR feed flow and opening any valves to the pressure charging system.

26. The method according to claim 22, wherein the method comprises locking or unlocking the freewheel mechanism arranged in the rotatable drive connection between the gas feeding device and the EGR drive unit.

27. A non-transitory computer readable medium carrying a computer program comprising program code for performing the method according to claim 22 when said program code is run on a computer.

\* \* \* \* \*